(12) United States Patent
Wright

(10) Patent No.: US 9,950,291 B1
(45) Date of Patent: *Apr. 24, 2018

(54) OPTIMIZED CONTROL OF A HEATER FOR AN AIR DRYER

(71) Applicant: NEW YORK AIR BRAKE, LLC, Watertown, NY (US)

(72) Inventor: Eric C. Wright, Evans Mills, NY (US)

(73) Assignee: NEW YORK AIR BRAKE, LLC, Watertown, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/381,511

(22) Filed: Dec. 16, 2016

(51) Int. Cl.
*B01D 53/04* (2006.01)
*B01D 53/26* (2006.01)

(52) U.S. Cl.
CPC ..... *B01D 53/0438* (2013.01); *B01D 53/0423* (2013.01); *B01D 53/0446* (2013.01); *B01D 53/0454* (2013.01); *B01D 53/261* (2013.01); *B01D 2257/80* (2013.01); *B01D 2259/40003* (2013.01)

(58) Field of Classification Search
CPC .............. B01D 53/261; B01D 53/0446; B01D 53/0454; B01D 53/0438; B01D 53/0423; B01D 2257/80; B01D 2259/40003; B01D 2259/4566
USPC ................ 95/14, 18, 117; 96/112, 121, 126; 34/80, 472, 473
See application file for complete search history.

(56) References Cited

U.S. PATENT DOCUMENTS

| 4,023,940 | A | | 5/1977 | Shultz | |
|---|---|---|---|---|---|
| 4,544,385 | A | * | 10/1985 | Tanaka | B01D 53/261 137/341 |
| 5,662,727 | A | * | 9/1997 | Castle | B01D 53/261 34/80 |
| 9,475,476 | B1 | | 10/2016 | Wright | |
| 9,803,778 | B2 | * | 10/2017 | Wright | F16K 49/00 |
| 2017/0307105 | A1 | * | 10/2017 | Wright | F16K 49/00 |

FOREIGN PATENT DOCUMENTS

DE 102013207566 10/2014
EP 3075433 10/2016

OTHER PUBLICATIONS

International Search Report Form PCT/ISA/210, International Application No. PCT/US2016/067167, pp. 1-10, dated Sep. 22, 2017.

* cited by examiner

*Primary Examiner* — Frank Lawrence
(74) *Attorney, Agent, or Firm* — Bond Schoeneck and King PLLC; David Nocilly

(57) ABSTRACT

An air dryer having a heater associated with its inlet and exhaust valves to prevent freezing at cold temperatures. The air dryer includes a temperature sensor associated with the valve block and a controller that can inhibit the operation of the valves when the temperature falls is a predetermined threshold until the heater can sufficiently warm the valve block. To prevent overheating of the heater, the controller can adjust the duty cycle of the heater as the inlet air temperatures increases.

14 Claims, 4 Drawing Sheets

OPTIMIZED CONTROL OF A HEATER FOR AN AIR DRYER

BACKGROUND OF THE INVENTION

1. Field of the Invention

The present invention relates to railway air system air dryers and, more particularly, to an air dryer having a valve block heater control system.

2. Description of the Related Art

A typical "twin-tower" desiccant-type air dryer includes two drying circuits that are controlled by valves. Wet inlet air flows through one circuit to remove water vapor, while dry product air counter flows through the other circuit to remove the accumulated water and regenerate the desiccant. Inlet and exhaust valves for each pneumatic circuit are responsive to controlling electronics to switch the air flow between the two circuits so that one circuit is always drying while the other is regenerating. The air dryer may include a pre-filtration stage with a water separator and/or coalescer positioned upstream of the drying circuits. The pre-filtration stage removes liquid phase and aerosol water and oil that can accumulate in air supply system as a result of the compression of ambient air by the locomotive air compressors. A pre-filtration stage includes a drain valve that is used to periodically purge any accumulated liquid. For example, a typical pre-filtration drain valve actuation cycle might command a purge (open) for two seconds every two minutes.

An air dryer for a rail vehicle must operate at freezing temperatures between −40° C. to 0° C. Further, the flow of cold air through the air dryer presents a significant cooling load on the dryer. Because the air flowing through the inlet stages of the air dryer contains moisture, the controlling valves in the dryer might freeze. A heater element is provided to warm the valve elements to mitigate ice formation. However, a heater with enough power to prevent freezing at −40° C. along with a high air flow rate may provide too much heat at higher air temperatures, such as those near 0° C. As a result, the heater element can become overheated before the valve block has heated sufficiently to be sensed by the temperature controller. Accordingly, there is a need in the art for an air dryer heater control system that can provide sufficient heat at extremely low temperatures without overheating at warmer temperatures.

BRIEF SUMMARY OF THE INVENTION

The present invention is a system and method for modulating the power to a heater on a railway air dryer to provide sufficient heat to prevent freezing at very low temperatures and high air flow rate while not overheating at freezing temperatures near 0° C. The an air dryer of the invention comprises an inlet for receiving a supply of compressed air, a pair of inlet valves and a corresponding pair of exhaust valves positioned in a valve block for controlling the movement of the compressed air through a corresponding pair of desiccant towers, a heater configured to warm the valve block, a temperature sensor for outputting a signal indicating a temperature of the valve block, and a controller that is programmed to determine whether the temperature of the valve block is below a first predetermined threshold and if so, inhibit the operation of the inlet valves and the exhaust valves until the temperature of the valve block is above a second predetermined threshold. The controller is programmed to operate the heater when the temperature of the valve block is below the first predetermined threshold until the temperature of the valve block is above the second predetermined threshold, and to only operate the inlet valves and the exhaust valves when the temperature of the valve block is above the second predetermined threshold. A second temperature sensor may be interconnected to the controller and positioned in the inlet for outputting a signal indicating a temperature of the compressed air in the inlet. The controller may then be programmed to operate the heater according to the temperature of the compressed air in the inlet. For example, the controller may be programmed to operate the heater according to a full duty cycle when the temperature of the compressed air in the inlet falls within a first range and according to a reduced duty cycle when the temperature of the compressed air in the inlet falls within a second range. The controller may be additionally programmed to operate the heater according to a normalized input voltage. The controller can also be programmed to delay the opening of the exhaust valve that corresponds to the inlet valve being opened when switching movement of the compressed air between the pair of desiccant towers if the compressed air in the inlet is below a predetermined temperature.

The present invention includes a method of preventing frozen air dryer valves by using an air dryer having an inlet for receiving a supply of compressed air, a pair of inlet valves and a corresponding pair of exhaust valves positioned in a valve block, a heater configured to warm the valve block, and a temperature sensor for outputting a signal indicating a temperature of the valve block. The method includes the step of determining whether the temperature of the valve block is below a first predetermined threshold and if so, inhibiting the operation of the inlet valves and the exhaust valves until the temperature of the valve block is above a second predetermined threshold. The method may include the further step of operating the heater when the temperature of the valve block is below the first predetermined threshold until the temperature of the valve block is above the second predetermined threshold. If a second temperature sensor is interconnected to the controller, the method may include the step of operating the heater according to the temperature of the compressed air in the inlet. For example, the step of operating the heater according to the temperature of the compressed air in the inlet may comprise operating the heater with a full duty cycle when the temperature of the compressed air in the inlet falls within a first range and with a reduced duty cycle when the temperature of the compressed air in the inlet falls within a second range. The method may further comprise the step of operating the heater according to a normalized input voltage. In any embodiment, the method may include the step of delaying the opening of the exhaust valve that corresponds to the inlet valve being opened when switching movement of the compressed air between the pair of desiccant towers if the compressed air in the inlet is below a predetermined temperature.

BRIEF DESCRIPTION OF THE SEVERAL VIEWS OF THE DRAWING(S)

The present invention will be more fully understood and appreciated by reading the following Detailed Description in conjunction with the accompanying drawings, in which.

DETAILED DESCRIPTION OF THE INVENTION

Figure 1:
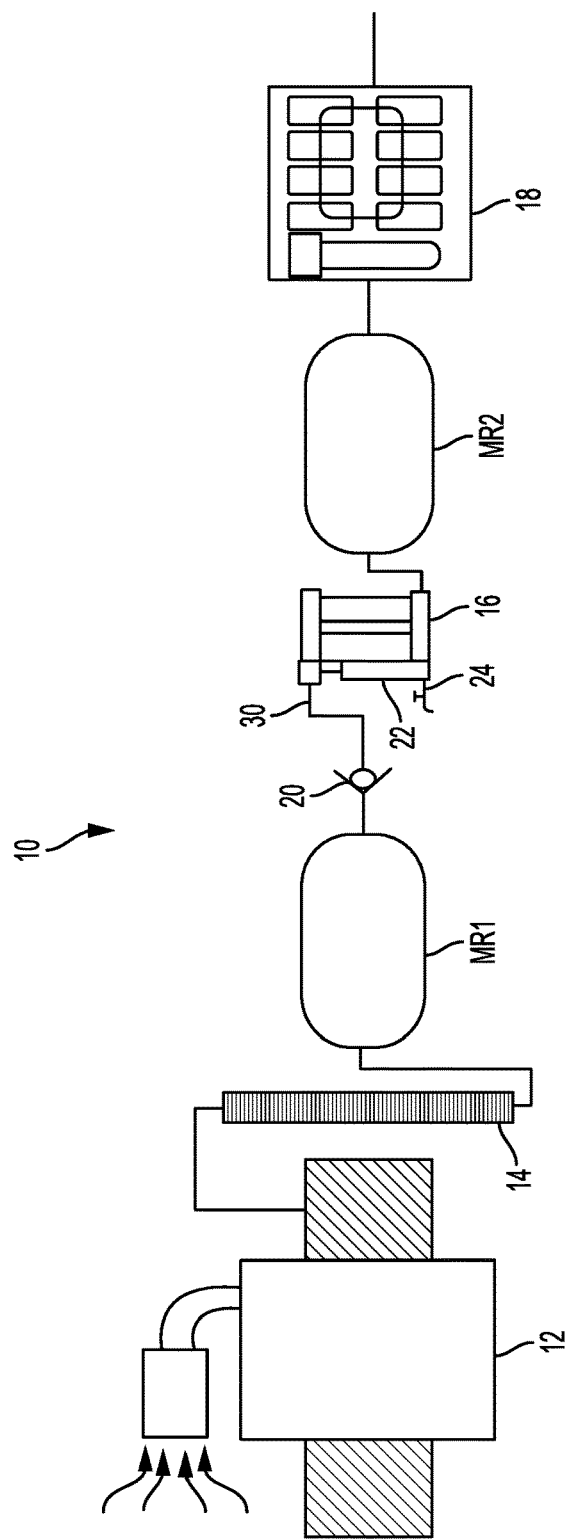
FIG. 1 is a schematic of a locomotive air supply system having an air dryer having a heated valve block according to the present invention.

Referring now to the drawings, wherein like reference numerals refer to like parts throughout, there is seen in FIG. 1 a locomotive air system 10 having an air compressor 12, aftercooler 14, first and second main reservoirs MR1 and MR2, and a two-tower desiccant air dryer 16 having heater control according to the present invention, as more fully described below. Second main reservoir MR2 is coupled to the braking system 18 and a check valve 20 is positioned between the first and second main reservoirs MR1 and MR2. A pre-filtration stage 22 is associated with air dryer 16 and includes a drain valve 24 that is operated according to a drain valve purge cycle time.

Figure 2:
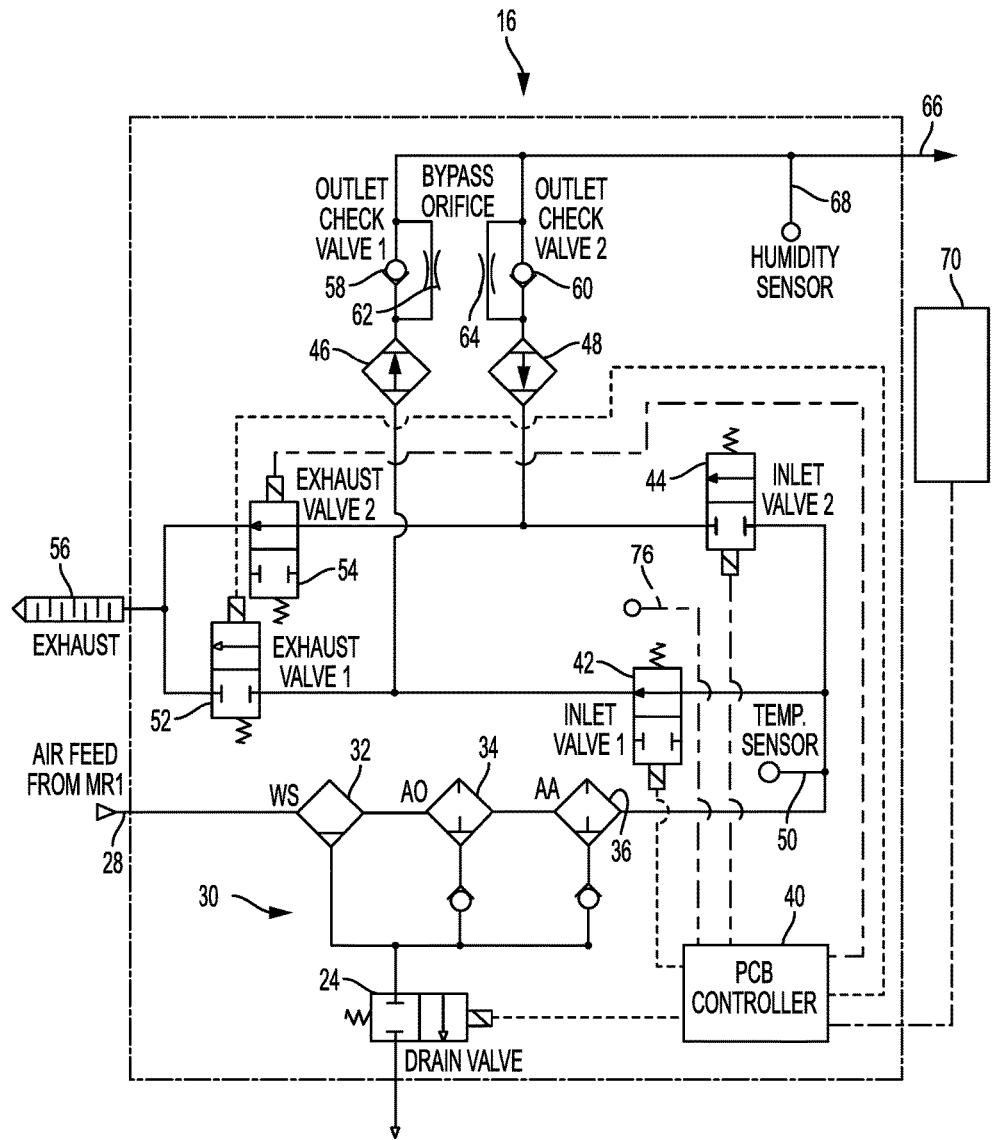
FIG. 2 is a schematic of an air dryer with an integral pre-filtration stage and a heated valve block according to the present invention.

Referring to FIG. 2, two-tower desiccant air dryer 16 comprises an inlet 28 for receiving air from first main reservoir MR1. Inlet 28 is in communication with pre-filtration stage 30, shown as comprising a water separator 32, a coarse coalescer 34, and a fine coalescer 36. Any accumulated liquids in water separator 32, coarse coalescer 34, and fine coalescer 36 are expelled through drain valve 24. A pair of inlet valves 42 and 44 are positioned downstream of pre-filtration stage 30 for diverting incoming air between one of two pathways, each of which is associated with one of two desiccant towers 46 and 48. A temperature sensor 50 is positioned upstream of inlet valves 42 and 44 and downstream of pre-filtration stage 30. Optionally, the temperature sensor 50, or a second temperature sensor 76 may be located in the valve block housing the series of valves. The first pathway downstream of first inlet valve 42 leads to an exhaust valve 52 and first desiccant tower 46. The second pathway downstream of second inlet valve 44 leads to a second exhaust valve 54 and second desiccant tower 48. The first pathway further includes a first check valve 58 and first bypass orifice 62 downstream of first desiccant tower 46, and the second pathway further includes a second check valve 60 and bypass orifice 64 downstream of second desiccant tower 48. A single outlet 66 is coupled to the end of the first and second pathways, and a humidity sensor 68 is positioned upstream of outlet 66. Inlet valves 42 and 44 and exhaust valves 52 and 54 are piloted by controller 40. Controller 40 operates inlet valves 42 and 44 and exhaust valves 52 and 54 so that compressed air provided at inlet 28 is directed through one of desiccant towers 46 or 48 for drying. The other of desiccant towers 46 or 28 may be regenerated by allowing dried air to reflow through bypass orifice 62 or 64 and out of exhaust valve 52 or 54 as needed. Controller 40 is also in communication with temperature sensor 50, temperature sensor 76, and humidity sensor 68.

Figure 3:
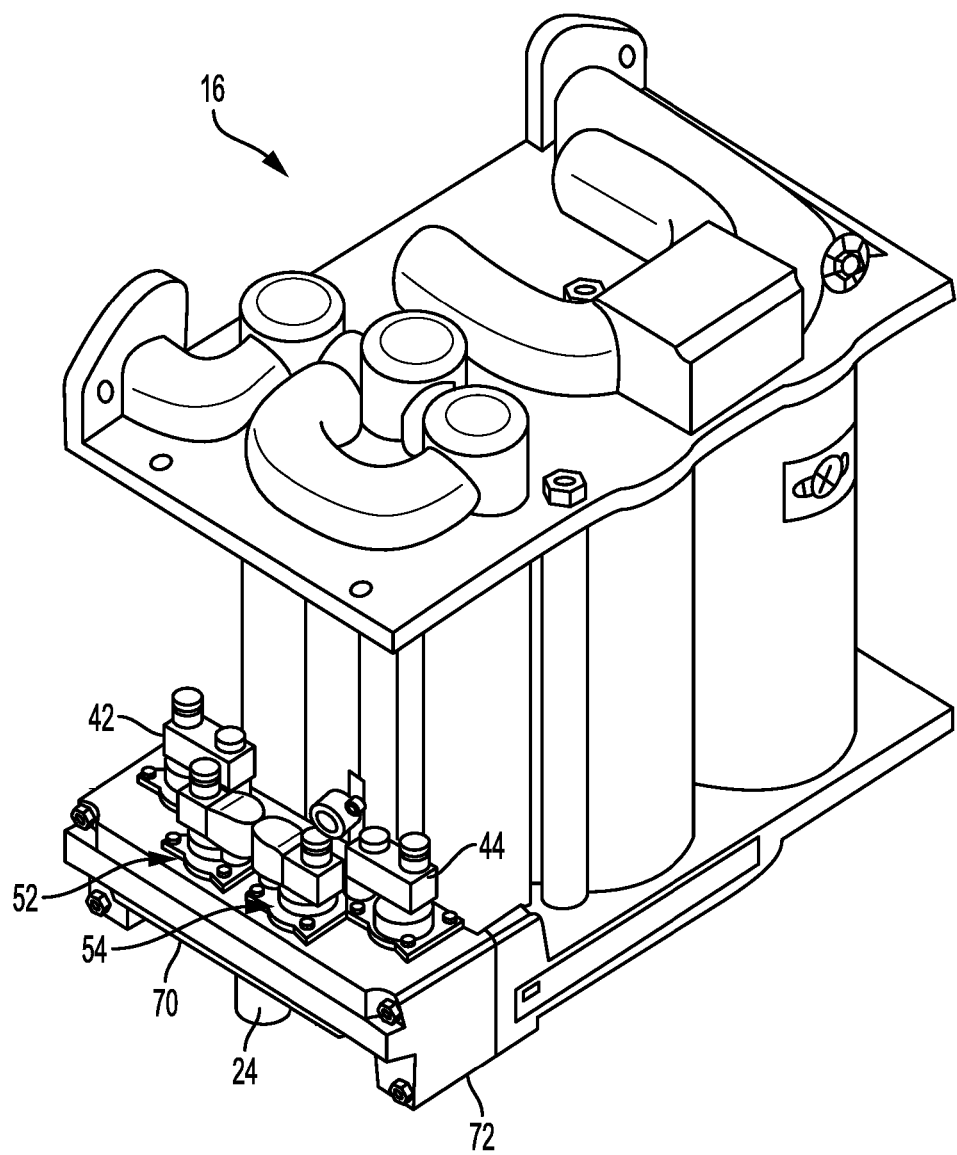
FIG. 3 is a schematic of a heated valve block of an air dryer with a pre-filtration stage according to the present invention.

A heating element 70 may also be coupled to controller 40 via field effect transistors (FETs), solid state relays, or electro-mechanical relays, and positioned in air dryer 16 to warm drain valve 24, inlet valves 42 and 44 and exhaust valves 52 and 54 if the temperature is below freezing. Heating element 70 must have sufficient power to prevent freezing at the minimum specified operating temperature of air dryer 16, which is typically −40° C., while flowing near-ambient temperature air of at least 60 to 100+ SCFM. The flow of cold air through dryer 16 presents a very significant cooling load. Testing has shown that at −40° C. and nominal air flow at least 525 watts of heater power is required to prevent freezing temperatures in the valve block 72 and freezing of drain valve 24, inlet valves 42 and 44 and exhaust valves 52 and 54. As seen in FIG. 3, the air dryer pathways seen in FIG. 1 are arranged so that drain valve 24, inlet valves 42 and 44, and exhaust valves 52 and 54 are commonly located along with heater element 70 in a valve block 72. As explained above, air dryer 16 includes temperature sensor 76 for determining the approximate temperature of valve block 72 and thus drain valve 24, inlet valves 42 and 44, and exhaust valves 52 and 54. Temperature sensor 50 is shown as being positioned to detect the temperature of air passing through air dryer 16, but may be positioned to detect the temperature of valve block 72 (shown as temperature sensor 76), the temperature of the inlet air, the temperature of ambient air, or some combination of the above.

Figure 4:
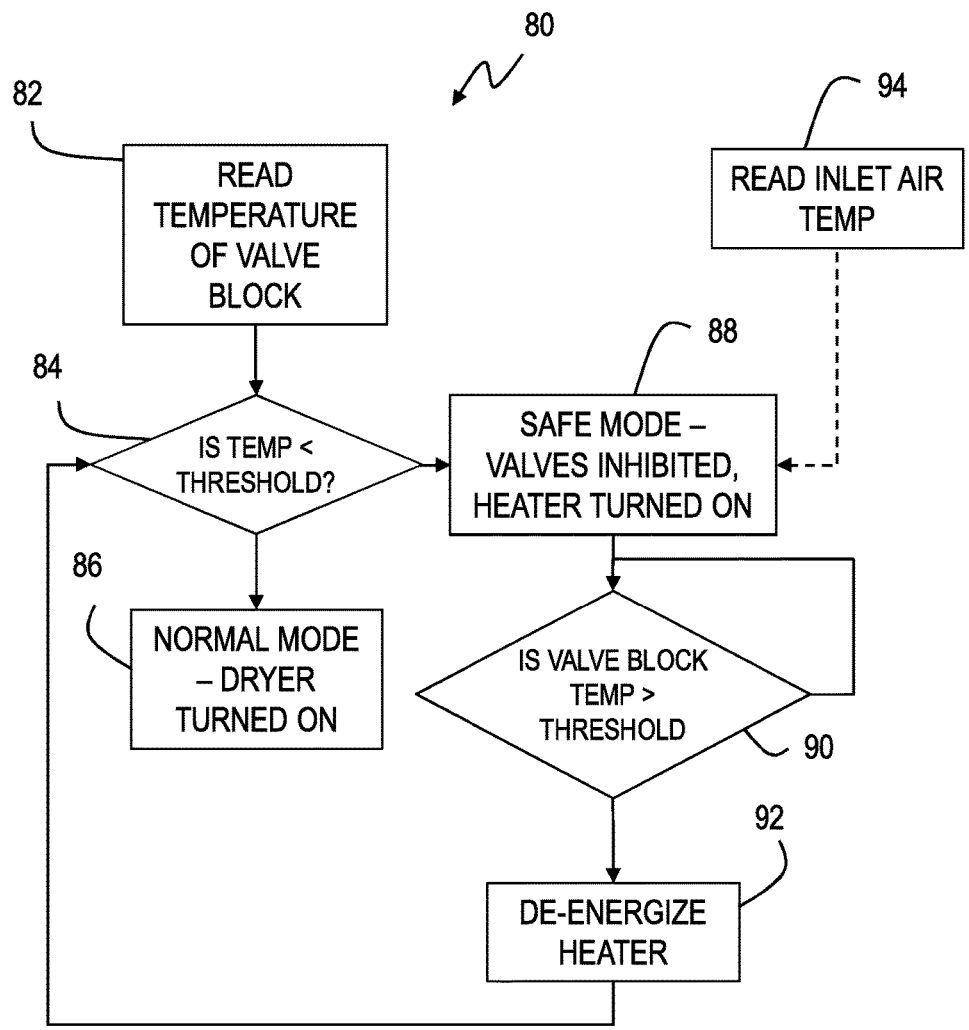
FIG. 4 is a flowchart of a heater control process for an air dryer having a heated valve block.

In the event of sub-freezing ambient temperatures, there is a risk of freezing of the various solenoid valves in positions that can adversely impact the locomotive air system 10. For example, if either or both of an inlet valve 42 or 44 and an exhaust valve 52 and 54 freeze in the open condition, one of the circuits can be left open. In this state, air dryer 16 will vent the main reservoir system (MR1 and MR2) at a rate greater than air compressor 12 can recharge, thereby resulting in an undesired train stoppage (the locomotive brake system is required to make a non-recoverable penalty brake application on low main reservoir pressure). Accordingly, referring to FIG. 4, air dryer controller 40 is programmed to implement a temperature dependent heater power control process 80 to ensure that valve block 72 is sufficiently heated to a temperature that avoids the likelihood any of the valves will become frozen without risking overheating of heater element 70. On initial start-up, all valves remain unpowered and controller 40 reads the temperature 82 of valve block 72, such as by using temperature sensor 76 positioned in valve block 72. Next, a check 84 is performed to determine whether the temperature is below a threshold representing a risk of freezing (any predetermined temperature selected to be indicative of a risk that drain valve 24, inlet valves 42 and 44, or exhaust valves 52 and 54 will become frozen, such as 3° C.). If the temperature is above the threshold, air dryer 16 may turn on and proceed with normal operations 86, i.e., a "normal mode" is implemented. If the temperature is below the threshold at check 84, controller 40 enters a safe mode 88 where valve operation is inhibited and heater element 70 is energized. Heating continues via the energization of heater element 70 until such time as the temperature of valve block 72 has risen above a second threshold at check 90, which may be the same temperature as check 84 or slightly higher, such as 12° C. If so, heater element 70 is de-energized 92 and control returns to check 84 so that heater element 70 may be re-energized whenever temperature falls below the threshold set by check 84 indicating a risk of freezing of the valves. As explained above, it is possible under certain circumstances that heater element 70 can overheat before temperature sensor 76 positioned in valve block 72 has sensed that valve block 72 has warmed sufficiently to allow de-energization of heater element 70 (heater element 70 temperatures of 180 to 200° C., for example, may damage heater element 70). Accordingly, controller 40 may be configured to read the inlet air temperature 94 when executing step 88 and to control the heater element 70 by controlling the supply of power proportionally to the inlet air temperature, such as by using pulse width modulation (PWM) control of heater element 70. At very low temperatures, e.g., −40° C. to 0° C., the PWM duty cycle provided by controller 40 may be one (1) so that heater element 70 is continuously powered to provide the full wattage of heating power. At warmer temperatures, such as 0° C., however, the PWM duty cycle may be reduced to provide enough heat to valve block 72 to prevent freezing without presenting a risk of overheating. For example, in a system having 525 watts of heating power that is otherwise needed for temperatures below −30° C., only 200 watts of power may be needed for temperatures close to 0° C. The power level needed to prevent freezing while not exceeding (heater element 70 temperatures of 180 to 200° C., for example, may damage heater element 70) working temperature can be determined experimentally for various points within the temperature range of −40° C. to 3° C. and then used to adjust the PWM duty cycle in an inlet air temperature heater control algorithm.

Temperature dependent heater power control process 80 may be open-loop, assuming 72V nominal input power (typical air dryer operating specifications requires operation from 50V DC to 93V DC (72V+/−30%). At high voltages, heater element 70 may still overheat and exceed the target working temperature, but it is assumed that operation at over-voltage is an infrequent occurrence particular in the simultaneous condition of overvoltage and ambient temperatures near freezing. To mitigate this risk, however, heater element 70 could include an over-temperature thermostat to open-circuit the heater whenever the temperature of heater element 70 exceeds a predetermined maximum value. Alternatively, a thermostat function could be provided by controller 40 with the addition of an additional thermistor embedded in heater element 70 coupled to controller 40. In this option, controller 40 could further module the PWM duty cycle in response to the temperature of heater element 70 approaching the maximum allowable operating temperature to allow heater element 70 to operate at or below, but not above, a maximum working temperature.

In another embodiment, controller 22 may read the input voltage and modulate via PWM the power to heater element 70 based on both air temperature and input voltage. As described above, power to heater element 70 may be proportional to the ambient temperature, providing maximum heater power at very low temperatures and lessor power at warmer temperatures. In addition, controller 22 can read the input voltage and adjust the power to heater element 70 to provide power that is equivalent to a nominal 72 V input. For a resistive load, power=$V^2$/R. Thus, a heater that dissipates 300 watts at 72 VDC will dissipate 500 watts at 93 VDC. In this case, controller 22 can decrease the PWM duty cycle to 300/500=0.6. If the ambient temperature is −1° C., for example, then the PWM duty cycle may be further reduced to be proportional to that temperature. If the temperature dependent PWM duty cycle was 0.5 at −1° C., then controller 22 would provide a PWM duty cycle of 0.6*0.5=0.3. Similarly, if the input voltage was 50 VDC, then the voltage-dependent PWM factor would be 300/145=2.0. If the ambient temperature factor is 0.5, per the example above, then the final PWM duty cycle would be 2.0*0.5=1.0. In this way, controller 22 can provide output power to heater element 70 that is normalized for both input voltage and ambient temperature.

To further guard against frozen valves, the normal mode of air dryer 16 may be altered. Because inlet valves 42 and 44 flow more air for a longer duration than exhaust valves 52 and 54, inlet valves 42 and 44 have a much higher probability of freezing open. For example, inlet valves 42 and 44 flow up to 150 SCFM for the full duration of the drying cycle, while the exhaust valves 52 and 54 have a 110 second cycle which is high-flow for the first few seconds as the desiccant chamber blows down, followed by an 18 SCFM purging flow for the balance of the 110 second cycle. Moreover, at cold temperatures, cycle extension may result in air flow through inlet valves 42 and 44 for as long as 30 minutes. Because of this distinction, controller 22 may be configured so that normal mode includes a time delay between the closing of an inlet valve 42 or 44 and the opening of the corresponding exhaust valve 52 or 54 when the inlet air temperature is below a predetermined temperature reflecting a risk of freezing, such as 0° C. In typical operation, only one inlet valve 42 or 44 is open at a time and therefore the full inlet flow is directed through that valve. As a consequence, at cold temperatures, the open inlet valve 42 or 44 sees very high cooling from the air flow which might cause freezing. At cold temperatures, controller 22 may command a switch from drying circuit A to circuit B by closing inlet valve 42 associated with circuit A, opening inlet valve 42 associated with circuit B, waiting a predetermined time, such as 1 minute, and then opening exhaust valve 52 associated with circuit A for its usual cycle. The delay would allow time for a sluggish inlet valve to warm and fully close, and if it was frozen open, then by having both inlet valves open simultaneously (A is frozen open, B is commanded open), then each valve will see only one-half of the inlet flow, reducing the flow dependent cooling influence on both valves and improving the opportunity for frozen inlet valve of circuit A to thaw before opening exhaust valve associated with circuit A.

As described above, the present invention may be a system, a method, and/or a computer program associated therewith and is described herein with reference to flowcharts and block diagrams of methods and systems. The flowchart and block diagrams illustrate the architecture, functionality, and operation of possible implementations of systems, methods, and computer programs of the present invention. It should be understood that each block of the flowcharts and block diagrams can be implemented by computer readable program instructions in software, firmware, or dedicated analog or digital circuits. These computer readable program instructions may be implemented on the processor of a general purpose computer, a special purpose computer, or other programmable data processing apparatus to produce a machine that implements a part or all of any of the blocks in the flowcharts and block diagrams. Each block in the flowchart or block diagrams may represent a module, segment, or portion of instructions, which comprises one or more executable instructions for implementing the specified logical functions. It should also be noted that each block of the block diagrams and flowchart illustrations, or combinations of blocks in the block diagrams and flowcharts, can be implemented by special purpose hardware-based systems that perform the specified functions or acts or carry out combinations of special purpose hardware and computer instructions.

What is claimed is:
1. An air dryer, comprising;
   an inlet for receiving a supply of compressed air;
   a pair of inlet valves and a corresponding pair of exhaust valves positioned in a valve block for controlling the movement of the compressed air through a corresponding pair of desiccant towers;
   a heater configured to warm the valve block;

a temperature sensor for outputting a signal indicating a temperature of the valve block; and a controller interconnected to the inlet valves and outlet valves, the heater, and the temperature sensor, wherein the controller is programmed to determine whether the temperature of the valve block is below a first predetermined threshold and if so, inhibit the operation of the inlet valves and the exhaust valves until the temperature of the valve block is above a second predetermined threshold.

2. The air dryer of claim 1, wherein the controller is programmed to operate the heater when the temperature of the valve block is below the first predetermined threshold until the temperature of the valve block is above the second predetermined threshold.

3. The air dryer of claim 2, wherein the controller is programmed to only operate the inlet valves and the exhaust valves when the temperature of the valve block is above the second predetermined threshold.

4. The air dryer of claim 3, further comprising a second temperature sensor interconnected to the controller and positioned in the inlet for outputting a signal indicating a temperature of the compressed air in the inlet.

5. The air dryer of claim 4, wherein the controller is programmed to operate the heater according to the temperature of the compressed air in the inlet.

6. The air dryer of claim 5, wherein the controller is programmed to operate the heater according to a full duty cycle when the temperature of the compressed air in the inlet falls within a first range and according to a reduced duty cycle when the temperature of the compressed air in the inlet falls within a second range.

7. The air dryer of claim 6, wherein the controller is additionally programmed to operate the heater according to a normalized input voltage.

8. The air dryer of claim 4, wherein the controller is programmed to delay the opening of the exhaust valve that corresponds to the inlet valve being opened when switching movement of the compressed air between the pair of desiccant towers if the compressed air in the inlet is below a predetermined temperature.

9. A method of preventing frozen air dryer valves, comprising the steps of:

providing an air dryer having an inlet for receiving a supply of compressed air, a pair of inlet valves and a corresponding pair of exhaust valves positioned in a valve block, a heater configured to warm the valve block, and a temperature sensor for outputting a signal indicating a temperature of the valve block; and determining whether the temperature of the valve block is below a first predetermined threshold and if so, inhibiting the operation of the inlet valves and the exhaust valves until the temperature of the valve block is above a second predetermined threshold.

10. The method of claim 9, further comprising the step of operating the heater when the temperature of the valve block is below the first predetermined threshold until the temperature of the valve block is above the second predetermined threshold.

11. The method of claim 10, wherein the air dryer further comprises a second temperature sensor interconnected to the controller and wherein the step of operating the heater comprises operating the heater according to the temperature of the compressed air in the inlet.

12. The method of claim 11, wherein the step of operating the heater according to the temperature of the compressed air in the inlet comprises operating the heater with a full duty cycle when the temperature of the compressed air in the inlet falls within a first range and with a reduced duty cycle when the temperature of the compressed air in the inlet falls within a second range.

13. The method of claim 12, further comprising the step of operating the heater according to a normalized input voltage.

14. The method of claim 9, further comprising the step of delaying the opening of the exhaust valve that corresponds to the inlet valve being opened when switching movement of the compressed air between the pair of desiccant towers if the compressed air in the inlet is below a predetermined temperature.

* * * * *